US011161388B2

(12) United States Patent
Stannard et al.

(10) Patent No.: US 11,161,388 B2
(45) Date of Patent: Nov. 2, 2021

(54) METHOD AND APPARATUS FOR HYBRID POWER TRAILER REFRIGERATION

(71) Applicant: ENERMOTION INC., Bolton (CA)

(72) Inventors: John Hamilton Stannard, Kitchener (CA); Jack W. MacDonnell, Walkerton (CA); Julian Kenney, Mississauga (CA); Mehrdad Taheri, Toronto (CA)

(73) Assignee: ENERMOTION INC., Bolton (CA)

( * ) Notice: Subject to any disclaimer, the term of this patent is extended or adjusted under 35 U.S.C. 154(b) by 224 days.

(21) Appl. No.: 16/312,440

(22) PCT Filed: Jun. 21, 2017

(86) PCT No.: PCT/CA2017/050759
§ 371 (c)(1),
(2) Date: Dec. 21, 2018

(87) PCT Pub. No.: WO2017/219140
PCT Pub. Date: Dec. 28, 2017

(65) Prior Publication Data
US 2019/0210424 A1    Jul. 11, 2019

Related U.S. Application Data

(60) Provisional application No. 62/353,370, filed on Jun. 22, 2016.

(51) Int. Cl.
*F25B 27/02* (2006.01)
*B60H 1/00* (2006.01)
(Continued)

(52) U.S. Cl.
CPC ......... *B60H 1/00364* (2013.01); *B60H 1/005* (2013.01); *B60H 1/00778* (2013.01);
(Continued)

(58) Field of Classification Search
CPC .... F25B 15/04; F25B 2400/24; F25B 25/005; F25B 27/02; B60H 1/00364;
(Continued)

(56) References Cited

U.S. PATENT DOCUMENTS 6,202,782 B1 * 3/2001 Hatanaka ................ B60L 50/16
180/301
6,327,994 B1 * 12/2001 Labrador ................ B63G 1/00
114/382

(Continued)

FOREIGN PATENT DOCUMENTS

CN        1451916 A    10/2003
CN        1847749 A    10/2006
(Continued)

OTHER PUBLICATIONS

WIPO, Written Opinion and International Search Report for PCT Application No. PCT/CA2017/050759 dated Sep. 20, 2017.
(Continued)

*Primary Examiner* — Filip Zec
(74) *Attorney, Agent, or Firm* — Norton Rose Fulbright Canada LLP

(57) ABSTRACT

A refrigeration system for cooling a refrigeration compartment. The refrigeration system comprises a cooling reservoir for cooling refrigerant in a first loop using energy recovered from an engine exhaust stream and a refrigeration circuit comprising a compressor drivable by an internal combustion motor, the compressor circulating refrigerant in a second loop. The refrigeration system comprises at least one heat exchanger in communication with the first and second loops to receive cooled refrigerant, and at least one blower for forcing air over the at least one heat exchanger. A controller selectively activates the internal combustion motor based on a temperature of the cooling reservoir.

24 Claims, 10 Drawing Sheets

(51) Int. Cl.
  *B60H 1/20* (2006.01)
  *B60H 1/32* (2006.01)
  *F25B 1/00* (2006.01)
  *F25B 15/04* (2006.01)
  *F25B 25/00* (2006.01)

(52) U.S. Cl.
  CPC ........... *B60H 1/00878* (2013.01); *B60H 1/20* (2013.01); *B60H 1/3204* (2013.01); *F25B 1/005* (2013.01); *F25B 27/02* (2013.01); *B60H 2001/00928* (2013.01); *B60H 2001/327* (2013.01); *F25B 15/04* (2013.01); *F25B 25/005* (2013.01); *F25B 2400/24* (2013.01); *Y02A 30/274* (2018.01)

(58) Field of Classification Search
  CPC ................ B60H 1/00378; B60H 1/005; B60H 1/00778; B60H 1/00878; B60H 1/20; B60H 1/3201; B60H 1/32011; B60H 1/3204; B60H 2001/00928; B60H 2001/327
  See application file for complete search history.

(56) References Cited

U.S. PATENT DOCUMENTS

| | | | | |
|---|---|---|---|---|
| 7,441,589 | B2 * | 10/2008 | Garrabrant | F25B 15/04 165/58 |
| 8,966,914 | B2 | 3/2015 | Stannard et al. | |
| 9,636,994 | B2 * | 5/2017 | Hinrich | H02K 9/22 |
| 9,759,433 | B2 * | 9/2017 | Hahn | F24H 7/04 |
| 9,956,850 | B2 * | 5/2018 | Casasanta | B60H 1/00378 |
| 2006/0112706 | A1 | 6/2006 | Inoue et al. | |
| 2010/0288571 | A1 * | 11/2010 | Dewis | F01K 3/02 180/165 |
| 2011/0294620 | A1 * | 12/2011 | Pruitt | B60K 6/48 477/5 |
| 2011/0307131 | A1 * | 12/2011 | Norden | B60L 3/0046 701/22 |
| 2012/0152635 | A1 * | 6/2012 | Hartjen, III | B60K 6/28 180/165 |
| 2014/0230463 | A1 * | 8/2014 | Ziehr | F25B 49/025 62/56 |
| 2015/0246593 | A1 | 9/2015 | Larson et al. | |
| 2016/0265830 | A1 * | 9/2016 | Weckwerth | F25B 49/043 |
| 2017/0120725 | A1 * | 5/2017 | Zhou | B60H 1/20 |
| 2017/0314423 | A1 * | 11/2017 | Dinkar | F01K 23/18 |
| 2018/0058769 | A1 * | 3/2018 | Bidner | F28F 27/00 |
| 2018/0162377 | A1 * | 6/2018 | Colavincenzo | B60K 6/24 |

FOREIGN PATENT DOCUMENTS

| | | |
|---|---|---|
| CN | 101769579 A | 7/2010 |
| CN | 103026149 A | 4/2013 |
| CN | 105437919 A | 3/2016 |
| DE | 102010049916 A1 | 5/2012 |
| DE | 202014101619 U1 | 4/2014 |
| WO | 2013050800 A1 | 4/2013 |

OTHER PUBLICATIONS

IP India, Office Action for IN Application No. 201817049004 dated Dec. 6, 2020.

CNIPA, Office Action for CN Application No. 201780051510.3 dated Jun. 16, 2020.

EPO, Search Report for EP Application No. 17814380.6 dated Jun. 26, 2020.

CNIPA, Office Action for CN Application No. CN2017800515103 dated Jan. 14, 2021.

* cited by examiner

METHOD AND APPARATUS FOR HYBRID POWER TRAILER REFRIGERATION

FIELD

The present disclosure relates to refrigeration in vehicles and containers, in particular, to a refrigeration system that uses captured thermal energy as a refrigeration source.

BACKGROUND

Certain goods being transported over long distances or over an extended period of time may need to be maintained at specific temperatures. When such goods are being transported, for example, by a transport truck, the trailer or container may be fitted with a refrigeration system to refrigerate the goods stored in the trailer.

Various systems have been developed for refrigerating the trailer. Unfortunately, existing refrigeration systems may require their own power source and fuel source. When such refrigeration systems are running for an extended period of time, pollutants may be released into the atmosphere. Further, over time, more fuel may be required to maintain operation of the refrigeration system. Moreover, existing refrigeration systems may not be configured to cool a refrigerant using energy recovered from an exhaust stream, such as from a power source, an engine, a motor, and the like, for refrigerating the interior of the trailer.

SUMMARY

Disclosed herein is a refrigeration system for cooling a refrigeration compartment, comprising: a cooling reservoir for cooling refrigerant in a first loop using energy recovered from an engine exhaust stream, a refrigeration circuit comprising a compressor drivable by an internal combustion motor, the compressor circulating refrigerant in a second loop, at least one heat exchanger in communication with the first and second loops to receive cooled refrigerant, at least one blower for forcing air over the at least one heat exchanger, and a controller for selectively activating the internal combustion motor based on a temperature of the cooling reservoir.

Disclosed herein is A method for cooling a vehicle component, comprising cooling refrigerant in a first loop in a cooling reservoir using energy recovered from an engine exhaust stream, circulating refrigerant in a second loop with a compressor of a refrigeration circuit, the compressor drivable by an internal combustion motor, forcing air over at least one heat exchanger in communication with the first and second loops with at least one blower, and selectively deactivating the internal combustion motor based on a temperature of the cooling reservoir.

Disclosed herein is a refrigeration system for cooling a vehicle refrigeration compartment, comprising: a cooling reservoir for cooling a first refrigerant using energy recovered by an energy capture system from an engine exhaust stream, a refrigeration circuit comprising a compressor driven by a diesel motor, the compressor circulating a second refrigerant, a heat exchanger in communication with the cooling reservoir and the refrigeration circuit to receive a stream of the first refrigerant and a stream of the second refrigerant, a blower for forcing air over the heat exchanger, and a controller for selectively activating the diesel motor based on a temperature of the cooling reservoir.

Many further features and combinations thereof concerning embodiments described herein will appear to those skilled in the art following a reading of the instant disclosure.

DETAILED DESCRIPTION

A refrigeration system and a method for its use are disclosed. The refrigeration system may be mounted to a vehicle compartment, such as the trailer of a transport truck to cool the interior of the trailer. The refrigeration system may cool the interior of the trailer using a cooling reservoir that cools a reefer cooling fluid with energy recovered from the vehicle's engine, or by operating a refrigeration circuit that circulates an auxiliary cooling fluid, the refrigeration circuit comprising a compressor and an evaporator. The cooling reservoir may be in communication with an energy capture system that captures thermal energy from the engine exhaust stream of the transport truck. The refrigeration circuit may be driven by an electric motor or a diesel motor. A photovoltaic cell array may generate electrical energy that is stored in an energy storage device for powering the electric motor.

Figure 1:
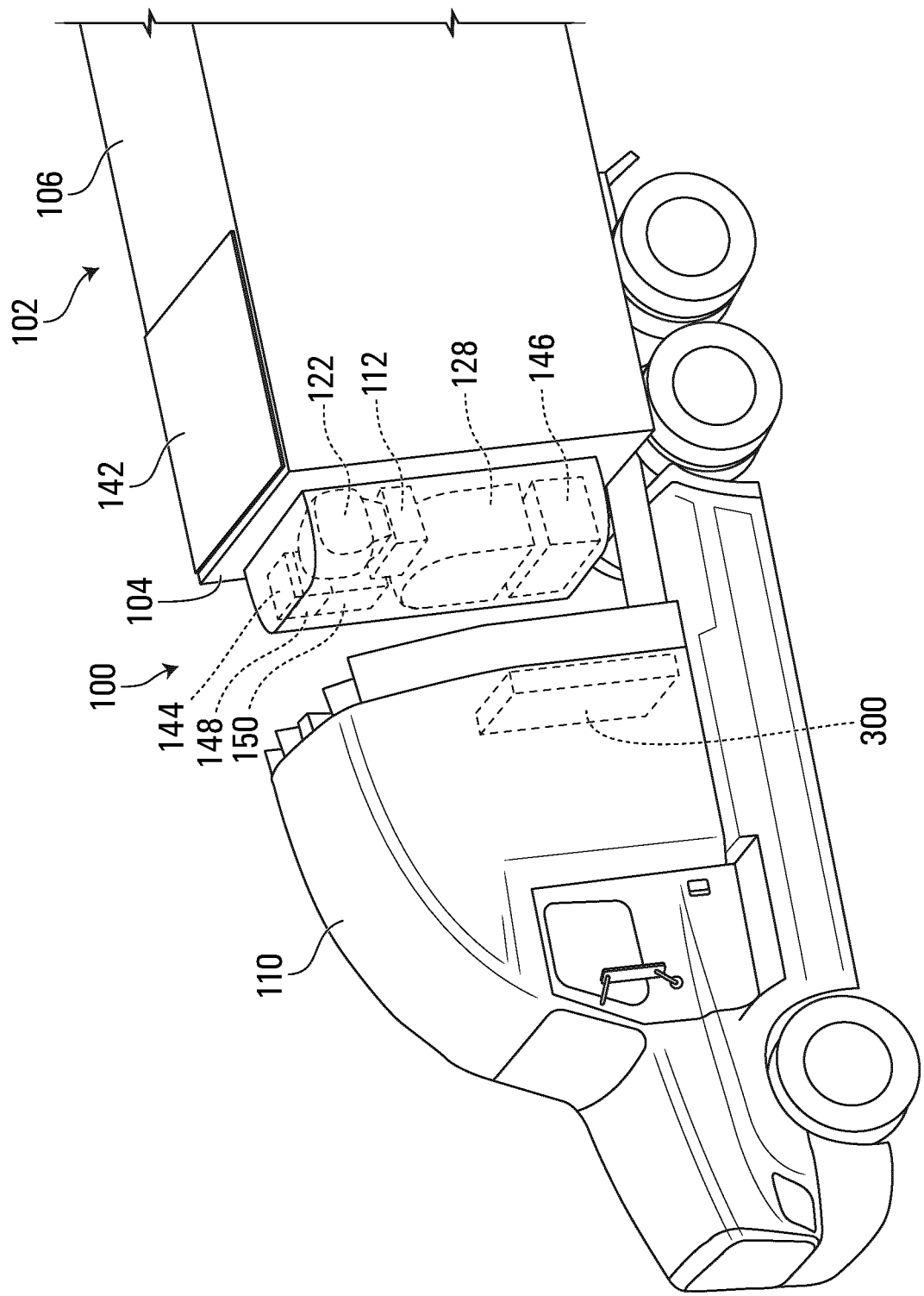
FIG. 1 is a schematic of a transport truck having the refrigeration system mounted to the trailer, and an energy capture system mounted to a truck chassis.

FIG. 1 depicts a refrigeration system 100 for refrigerating a trailer 102 of a transport truck. The refrigeration system 100 may be mounted on a front face 104 of the trailer 102, the front face 104 opposing a cabin 110 of the transport truck. While the refrigeration system 100 is depicted in FIG. 1 as being installed on a trailer 102 of a transport truck, the refrigeration system 100 may be used with other vehicles, such as vans, trucks, boats, and the like. In some embodiments, the refrigeration system 100 may be used with stationary containers, or containers transported by rail or by ships.

To cool the interior 108 of the trailer 102, the refrigeration system 100 comprises a cooling reservoir 128 and a refrigeration circuit, the refrigeration circuit comprising a compressor 112, an evaporator 114, a blower 116, and a heat exchanger 118 in fluid communication. The refrigeration circuit may be a closed circuit. To drive the refrigeration circuit, the refrigeration system 100 may comprise an internal combustion motor 122 or an electric motor 138 that are coupled to the compressor 112. The refrigeration system 100 may comprise a fuel tank in communication with the internal combustion motor 122 for storing and supplying the fuel of the internal combustion motor 122. The refrigeration system 100 may comprise a power supply, such as an energy storage device 146 in communication with the electric motor 138 for storing electrical energy to power the electric motor 138.

The refrigeration system 100 further comprises a controller 150 to control whether the cooling reservoir 128 or the refrigeration circuit may be refrigerating the trailer 102. In some embodiments, the controller 150 may be programmed such that the refrigeration system 100 prioritizes using the cooling reservoir 128 to cool the interior 108 of the trailer 102, and then using the refrigeration circuit as a backup to the cooling reservoir 128.

In some embodiments, the refrigeration system 100 comprises an electrical power source, such as a photovoltaic cell array 142. As depicted in FIG. 1, the photovoltaic cell array 142 is mounted on a top surface 106 of the trailer 102. The photovoltaic cell array 142 may be mounted on any surface of the trailer 102 that may receive solar radiation. The photovoltaic cell array 142 may generate electrical energy that may be stored in the energy storage device 146. Where the refrigeration system 100 comprises the photovoltaic cell array 142, the refrigeration system 100 comprises an inverter 144 and a charge controller 148 for controlling storage of electrical energy generated by the photovoltaic cell array 142 in the energy storage device 146.

Figure 3:
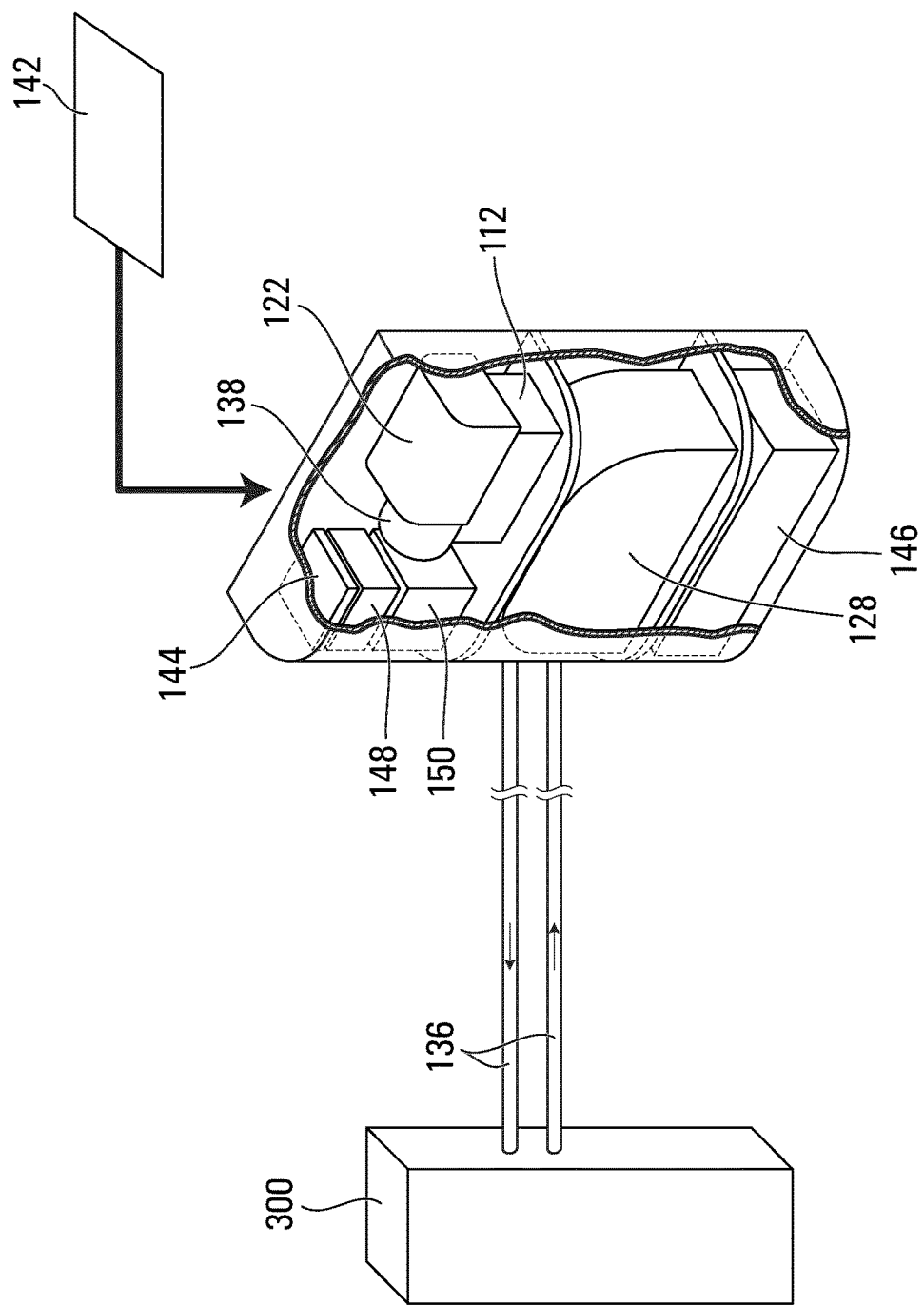
FIG. 3 is a schematic of the refrigeration system of FIG. 1 in communication with an energy capture system.
Figure 8:
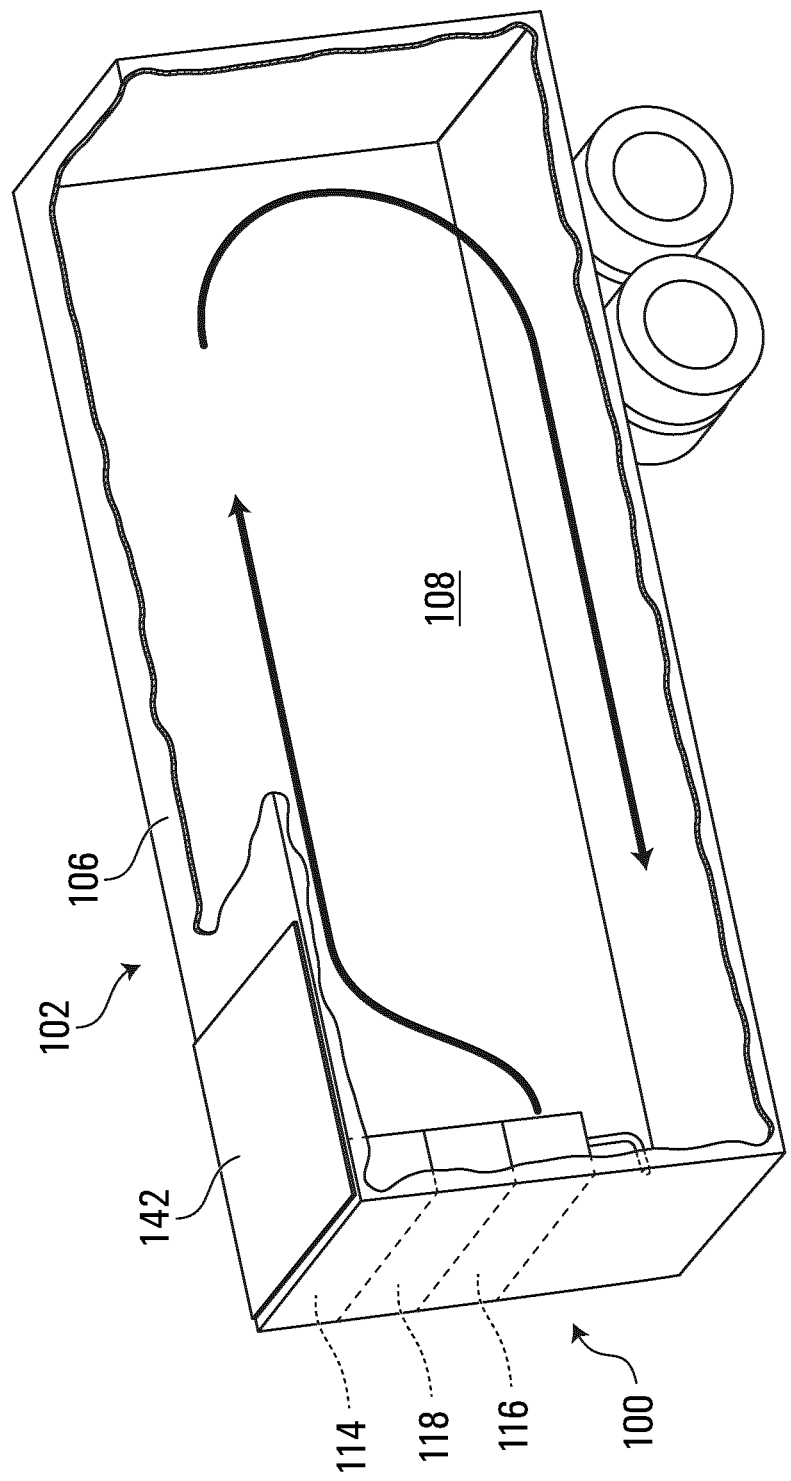
FIG. 8 is a schematic of the interior of the trailer on which the refrigeration system of FIG. 1 is mounted.

Some components of the refrigeration system 100 may be mounted outside of the trailer 102, and other components of the refrigeration system 100 may be mounted inside the trailer 102 and exposed to the interior 108 of the trailer 102. As depicted in FIG. 1 and FIG. 3, the cooling reservoir 128, the compressor 112, the internal combustion motor 112, the electric motor 138, the energy storage device 146, the controller 150, the photovoltaic cell array 142, the charge controller 148, and the inverter 144 may be mounted outside of the trailer 102. As depicted in FIG. 8, the evaporator 114, the blower 116, and the heat exchanger 118 may be mounted inside the trailer 102 and exposed to the interior 108 of the trailer 102.

As depicted in FIG. 1, an energy capture system 300 may be mounted to the cabin 110. The energy capture system 300 may store and release thermal energy in a controlled manner to enable a vehicle, such as a transport truck, to continue to provide heating and cooling to the cabin 110 or to other systems within the vehicle when the main engine is not running. The energy capture system 300 may reduce fuel consumption, emissions, and promote compliance with existing or upcoming anti-idling legislation. When it is cold, such as during the winter months, heat may be captured from the engine's exhaust or engine cooling system and may be stored in an insulated tank for later use. When it is warm, such as during the summer months, the heat from the vehicle exhaust system may be used to drive an absorption refrigeration unit that cools a liquid or creates ice, which may be stored in the insulated tank for later use. The ice may be melted at a later time, drawing thermal energy from the surrounding environment to provide a source of cooling. When storing heat or cooling a liquid, the energy capture system 300 may not use additional fuel, which may reduce fuel cost for the operator who wishes to have heating or cooling available at a time that would normally require leaving an engine idling while the vehicle is not being driven. The energy capture system 300 may use waste heat expelled by an engine by capturing the waste heat in a bottoming cycle and storing it in an absorption cycle.

Figure 2:
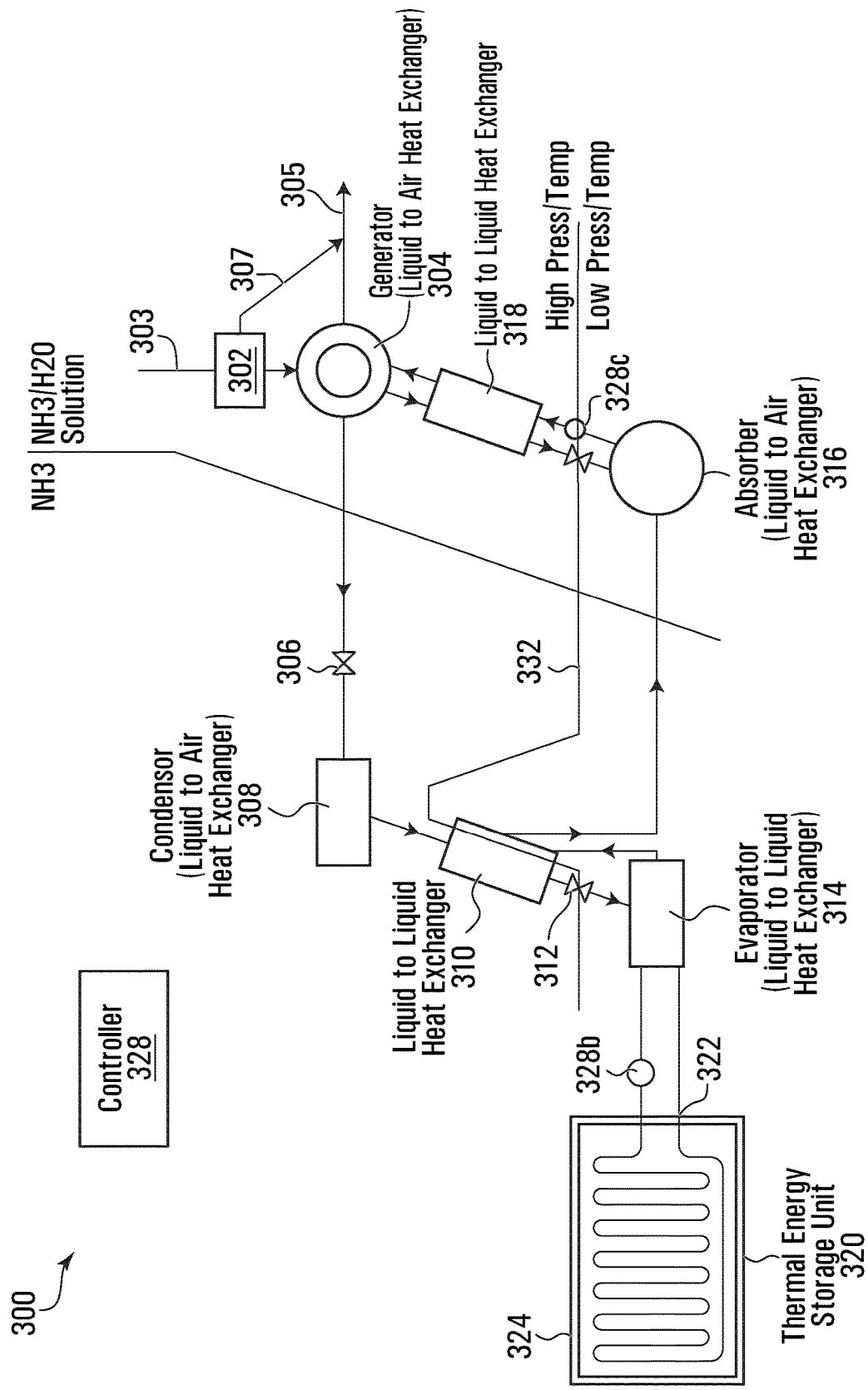
FIG. 2 is a block diagram of an energy capture system in cold storage mode.

The energy capture system 300 comprises a controller 328, as depicted in FIG. 2, for controlling how the captured energy is used. The controller 328 of the energy capture system 300 may receive signals corresponding to the temperature of the cabin 110, the temperature of the cooling reservoir of the cabin 110, the temperature of the cooling reservoir 128 of the refrigeration system 100, and manual inputs from a user, and may direct the captured energy to change the temperature of the cabin 110, to store the captured energy in a cooling reservoir of the cabin 110, or to store the captured energy in the cooling reservoir 128 of the refrigeration system 100.

FIG. 2 depicts a block diagram of an energy capture system 300 operating in a cold storage mode. The energy capture system 300 may comprise a diverter valve 302, a generator 304, a valve 306, a condenser 308, an evaporator pre-cooler 310, an orifice 312, an evaporator 314, an absorber 316, and an absorber pre-cooler 318.

Exhaust from an engine of a vehicle connected to the energy capture system 300 flows through the generator 304 of the energy capture system. The exhaust enters the generator 304, as indicated by arrow 303, and after passing through the generator 304, the exhaust exits the generator 304, as indicated by arrow 305. The generator 304 absorbs heat from the exhaust gas and transfers this heat to a solution, for example water with dissolved ammonia, being circulated through a heat exchanger portion of the generator 304. Accordingly, the solute (e.g., the ammonia) boils out of the solution and is vaporized. The generator 304 is in fluid communication with the valve 306. The vaporized ammonia gas flows through the valve 306, which is configured to direct the ammonia gas towards a condenser 308 of the energy capture system 300 while the energy capture system 300 operates in the cold storage mode. The solvent of the solution (e.g., water) is left behind at the generator 304. As an example, dividing line 330 illustrates the division between the portion of the energy capture system 300 where an ammonia/water solution is circulated (e.g., through the absorber 316, the absorber pre-cooler 318, and the generator 304) and the portion of the energy capture system 300 where substantially only ammonia is circulated (the valve 306, the condenser 308, the evaporator pre-cooler 310, the orifice 312, and the evaporator 314).

Further, example test results provide an approximate indication of the temperatures and pressures that may be observed at various stages in the energy capture system 300 when operating in a cooling mode. For example, typical exhaust gas from a diesel powered truck may enter the generator 304 at a temperature of about 400 degrees Celsius and may exit the generator 304 at a temperature of about 300 to 380 degrees Celsius, assuming the exhaust gas was not diverted by a diverter valve 302 through a bypass path 307. Pressure in the heat exchanger portion of the generator 304 may reach about 120 to 250 psig, resulting in ammonia gas flowing towards the condenser 308 at a pressure of about 120-250 psig and a temperature of approximately 130 degrees Celsius. While specific examples and/or ranges of observed temperatures and/or pressures and provided here and further on in the description, these temperatures and pressures are dependent on the exact design and operating mode of the energy capture system 300 and may vary substantially depending on the desired design criteria and operating mode of the energy capture system 300. In other words, the examples of observed pressures and temperatures in the energy capture system 300 are provided as examples only and are not intended to be limiting.

The vaporized ammonia gas arriving at the condenser 308 is cooled and condensed into a liquid to surrender some of the heat carried by the ammonia gas. In a cooling mode of the energy capture system 300, it may be the pressure of the ammonia gas that is desired to act as an energy source at the evaporator 314. However the resulting high temperature assumed by the ammonia is not needed and the ammonia is therefore cooled before arriving at the evaporator 314. For example, the condenser 308 may cool the ammonia to approximately 50 to 60 degrees Celsius by transferring the heat to the surrounding air using a coil and fan design liquid to air heat exchanger. The ammonia may remain at 120-250 psig on exiting the condenser 308 and flowing towards the evaporator pre-cooler 310.

The ammonia liquid is further cooled, for example, in a first fluid passage (e.g., a fluid coil) at the evaporator pre-cooler 310. The heat exchanger portion of the evaporator pre-cooler 310 may be of the liquid to liquid type and transfers thermal energy between the first fluid passage going from the condenser 308 to the evaporator 314 (e.g., the first coil) and from the fluid passage going between the evaporator 314 and the absorber 316 (e.g., a second coil). The ammonia leaving the first coil of the evaporator pre-cooler 310 will be cooler than the ammonia liquid entering the second coil of the evaporator pre-cooler 310. For example, the ammonia liquid leaving the first coil of the evaporator pre-cooler 310 may be at a temperature of about 50 degrees Celsius and a pressure of about 120-250 psig.

The ammonia gas exiting the first coil of the evaporator pre-cooler 310 passes through the spray orifice 312 and passes into or is injected into the evaporator 314. The orifice 312 creates a boundary between the high pressure side of the energy storage system 300 and the low pressure side of the energy storage system 300, illustrated by line 332. As the ammonia passes through the orifice 312 into the cavity of the evaporator 314 (e.g., through a first fluid passage of the evaporator 314), the ammonia vaporizes because the ammonia encounters an area of lower pressure, which also forces the temperature of the ammonia down significantly. In the process of vaporizing, the ammonia absorbs thermal energy through the heat exchanger portion of the evaporator 314 from a thermal storage fluid, which may be a refrigerant such as glycol or a water/glycol mixture, being circulated through a second fluid passage (e.g., a fluid coil) of the evaporator 314, thereby cooling the thermal storage fluid, which flows onwards to a thermal unit input fluid passage (e.g., a coil and circuit) 322. The ammonia that enters the evaporator 314 after passing through the orifice 312 may have a temperature of approximately −10 to −5 degrees Celsius and a pressure of approximately 0-5 psig. The ammonia gas that leaves the evaporator 314 and flows back to the evaporator pre-cooler 310 may have, for example, a temperature between −5 and 0 degrees Celsius and a pressure of approximately 40 to 55 psig.

The cooled thermal storage fluid flows through the thermal unit input fluid passage 322 from the evaporator 314 to a cooling reservoir 320. In some embodiments, the cooled thermal storage fluid may be pumped from the from the evaporator 314 to the cooling reservoir 320 with a pump 328b. FIG. 2 depicts that the evaporator 314 is connected to one cooling reservoir 320 via the thermal unit input fluid passage 322. In some embodiments, the evaporator 314 may be connected more than one cooling reservoir 320. The evaporator 314 may be connected to each cooling reservoir 320 via their own thermal unit input fluid passages. In some embodiments, the cooling reservoir 320 may be the cooling reservoir of the cabin 110, or may be the cooling reservoir 128 of the refrigeration system 100.

The cooling reservoir 320 may be, for example, a sealed storage tank that houses and insulates the thermal storage fluid, and promotes heat transfer between the thermal storage fluid and other materials housed in the cooling reservoir 320. In one example, the thermal storage fluid may be glycol or a water/glycol mixture. In some embodiments, the cooling reservoir 320 may comprise a phase-changing material (e.g. water) that is fluidly isolated from the thermal storage fluid. The phase-changing material may be contained in chambers that are separate from the thermal storage fluid. Heat transfer may occur between the thermal storage fluid and the phase-changing material, such that the phase-changing material changes phase, such as from liquid to solid, to store the thermal energy transferred from the thermal storage fluid. The cooling reservoir 320 may include an input fluid passage 322 (e.g., a fluid coil and circuit) to receive a first thermal storage fluid for conducting heat transfer with the phase-changing material. The cooling reservoir 320 may include an output fluid passage 324 (e.g., a fluid coil and circuit) to receive a second thermal storage fluid for conducting heat transfer with the phase-changing material. In some embodiments, where the cooling reservoir 320 is the cooling reservoir 128 of the refrigeration system 100, the phase-changing material may be cooled by heat transfer with the first thermal storage fluid, and the cooled phase-changing material may cool a reefer cooling fluid, which may be a refrigerant such as glycol or a water/glycol mixture, by receiving thermal energy from the reefer cooling fluid to cool the reefer cooling fluid, such that the cooled reefer cooling fluid may cool the interior 108 of the trailer 102. Where the cooling reservoir 320 is the cooling reservoir 128 of the refrigeration system 100, the input fluid passage 322 may be thermal transfer lines 136, and the output fluid passage 324 may be thermal transfer lines 130.

After cooling the thermal storage fluid in the evaporator 314, the ammonia gas passes again through the evaporator pre-cooler 310, this time through the second fluid passage and absorbs heat surrendered by the first fluid passage. The ammonia gas may leave the second coil of the evaporator pre-cooler 310 at temperature of about 10 degrees higher than on entering the second fluid passage of the evaporator pre-cooler 310, and the ammonia gas flows onwards through the low pressure side of the energy capture system 300 towards the absorber 316. In some embodiments, the evaporator pre-cooler 310 is an optional component of the energy capture system 300. The evaporator pre-cooler 310 may increase performance of the energy capture system 300.

At the absorber 316, the ammonia is absorbed back into the water. The water that the ammonia absorbs into may be the nearly ammonia free water from which the ammonia boiled out of at the generator 304. The ammonia gas flows through the absorber 316, which includes a heat exchanger that allows the ammonia gas to dissolve back into the water by cooling both fluids to a temperature where such may occur. The absorber 316 may include a spray bar at its lower end, which the ammonia is fed through where the ammonia bubbles to the top and is largely absorbed in the water. The water/ammonia solution may be pumped up to a higher pressure and temperature (e.g., across line 332 by a pump 328c) and arrive next at the absorber pre-cooler 318.

The water/ammonia solution passes through the absorber pre-cooler 318. Passing the water/ammonia solution through the absorber pre-cooler 318 may be an optional step that may to increase the efficiency of the energy capture system 300.

The absorber pre-cooler 318 may be an optional component of the energy capture system 300. In embodiments that do use the absorber pre-cooler 318, the water/ammonia solution flowing towards the generator 304 through a first fluid passage (e.g., a first coil) of the pre-cooler 318 absorbs heat while the water flowing from the generator 304 to the absorber 316 (e.g., water that has had the ammonia boiled out of solution) through a second fluid passage (e.g., a second coil) of the pre-cooler 318 is cooled to bring the water closer to the temperature where re-absorption of ammonia will occur at the absorber 316. The water/ammonia solution arriving at the generator 304 may be heated by exhaust gas received from the vehicle, and the energy capture cycle may repeat.

While an ammonia/water solution is provided as an example as a suitable solvent/solute for operating the energy capture system 300, any suitable solvent/solute combination may be used, depending on the design criteria of a particular application.

An example energy capture system 300 is disclosed in granted U.S. Pat. No. 8,966,914, the contents of which are incorporated herein by reference.

FIG. 3 is a schematic of the refrigeration system 100 in communication with the energy capture system 300. The refrigeration system 100 comprises the cooling reservoir 128 that is coupled with the energy capture system 300. In some embodiments, thermal transfer lines 136 couple the cooling reservoir 128 and the energy capture system 300. The cooling reservoir 128 is also coupled with the heat exchanger 118 in the trailer 102 by thermal transfer lines 130.

In some embodiments, the cooling reservoir 128 comprises one or more chambers, such as sealed tubes, inside the cooling reservoir 128. The chambers contain phase-changing material, such as water. Depending on its temperature, the phase-changing material may be in a solid, liquid, or gas phase. The energy capture system 300 may use heat from the engine exhaust stream to cool a thermal storage fluid. The cooling reservoir 128 receives the cooled thermal storage fluid, directed into the cooling reservoir 128 from the energy capture system 300 via the thermal transfer lines 136. In some embodiments, the cooled thermal storage fluid may be pumped from the energy capture system 300 into the cooling reservoir 128. When the cooled thermal storage fluid flows into the cooling reservoir 128, the cooled thermal storage fluid contacts the surface of the chambers. When the temperature of the phase-changing material in the chambers is greater than the temperature of the cooled thermal storage fluid, heat transfer occurs from the phase-changing material to the cooled thermal storage fluid, such that the temperature of the phase-changing material is decreased while the temperature of the cooled thermal storage fluid increases. In some examples, the phase-changing material may be cooled to −10 degrees Celsius. Where the phase-changing material is water, the water may be sufficiently cooled to change from liquid water to ice. In other words, thermal energy captured by the energy capture system 300 may be used to cool the thermal storage fluid, which may be used to change the phase of the phase-changing material in the cooling reservoir 128. The thermal storage fluid, which may have an increased temperature after it receives thermal energy from the phase-changing material, may be directed back to the energy capture system 300 to be cooled again. When the phase-changing material is being cooled by the thermal storage fluid from the energy capture system 300, the energy capture system 300, the cooling reservoir 128, and the thermal transfer lines 136 may define a closed circuit that may be isolated from the remainder of the refrigeration system 100, for example, by valves, such that the cooled thermal storage fluid from the energy capture system 300 may cool the phase-changing material in the chambers of the cooling reservoir 128 and not cool other components of the refrigeration system 100.

Figure 4:
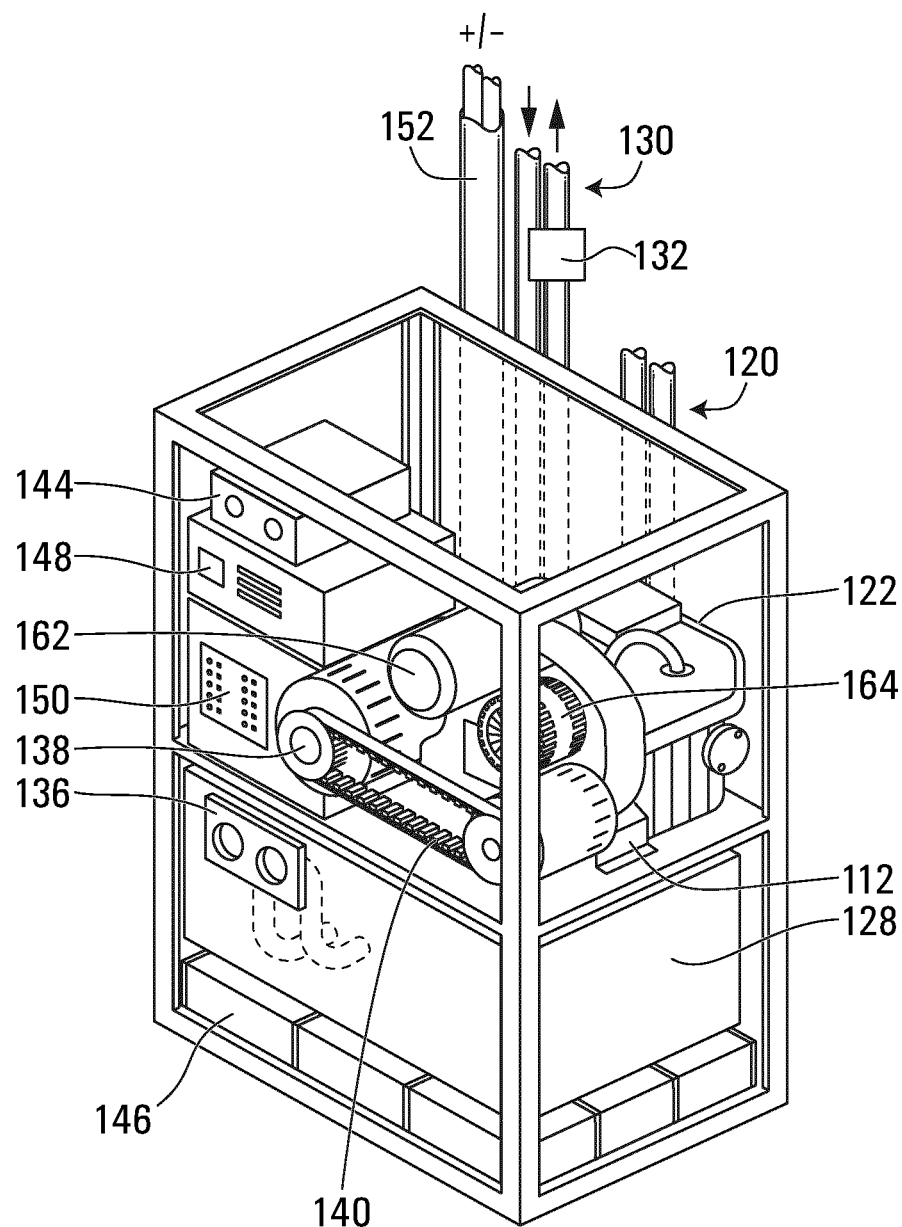
FIG. 4 is a schematic of a perspective view of the refrigeration system of FIG. 1.
Figure 6:
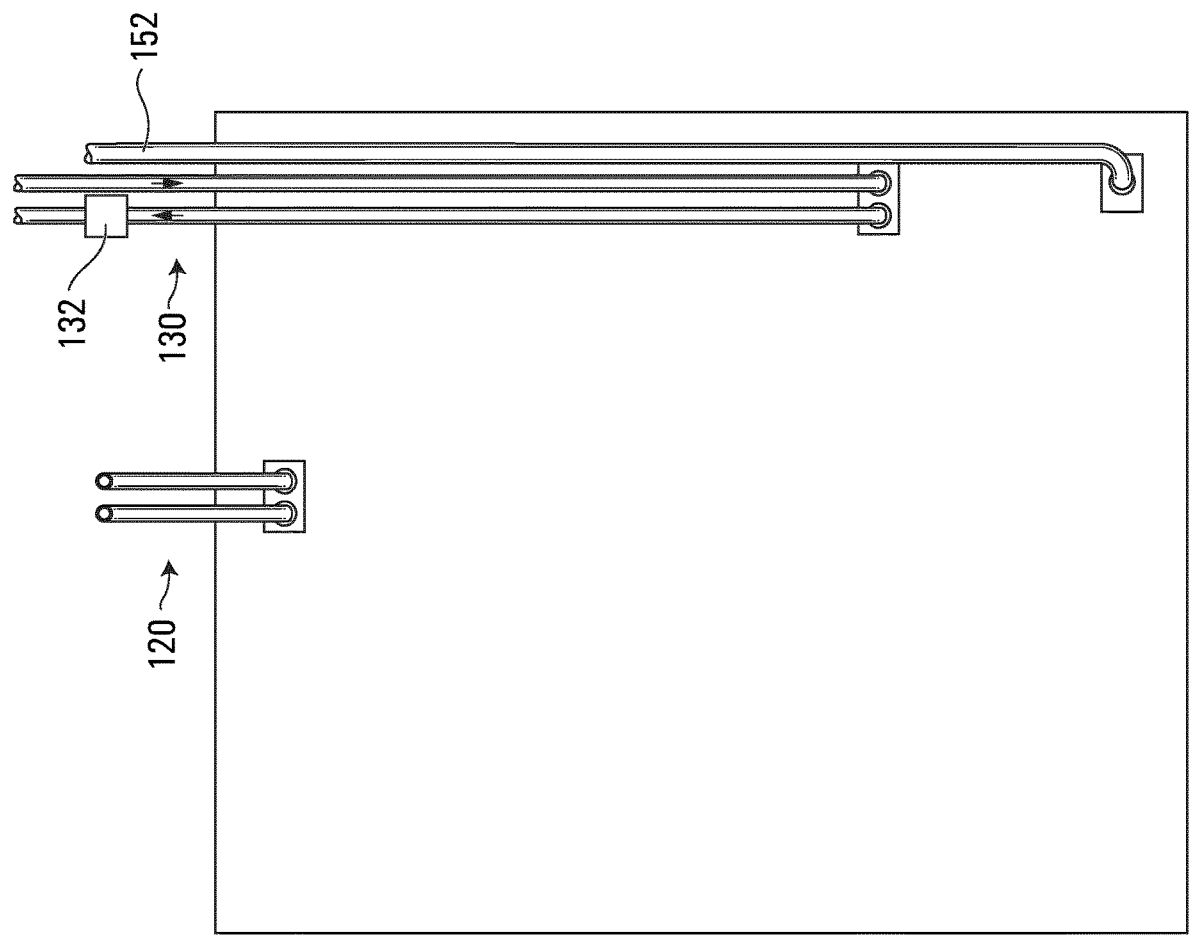
FIG. 6 is a schematic of a back view of the refrigeration system of FIG. 1.
Figure 7:
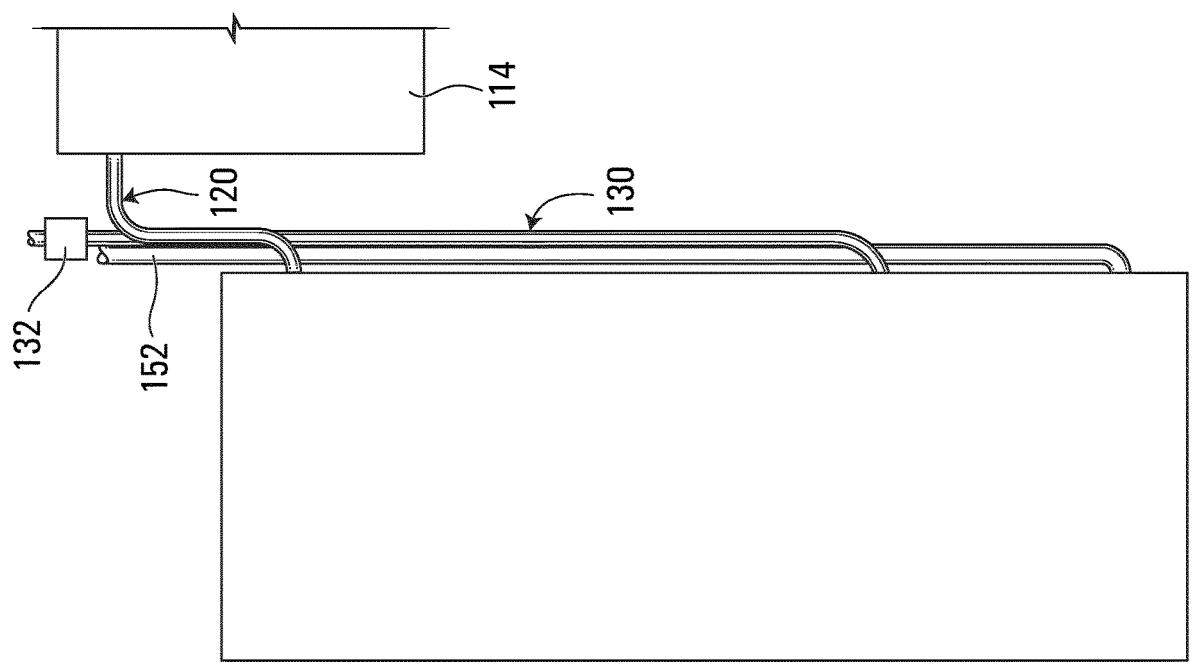
FIG. 7 is a schematic of a side view of the refrigeration system of FIG. 1.

The cooling reservoir 128 may be connected to the heat exchanger 118 that may be inside the trailer 102 via thermal transfer lines 130, as depicted in FIG. 4 and FIG. 6. A reefer cooling fluid, such as glycol or a water/glycol mixture, may be conducted through the cooling reservoir 128, the transfer lines 130, and the heat exchanger 118 to reduce the temperature in the trailer 102. The reefer cooling fluid may be cooled by the phase-changing material, if the phase-changing material has a lower temperature than the reefer cooling fluid, such as after the phase-changing material has been cooled by the thermal storage fluid from the energy capture system 300. For example, when the phase-changing material is water, the water may be cooled by the thermal storage fluid from the energy capture system 300 to ice, and the ice may cool the reefer cooling fluid conducted between the cooling reservoir 128 and the heat exchanger 118. The reefer cooling fluid may directly contact the chamber holding the phase-changing material, and heat transfer may occur from the relatively warm reefer cooling fluid to the relatively cooled phase-changing material, such that the temperature of the phase-changing material is increased while the temperature of the reefer cooling fluid decreases. When the reefer cooling fluid is being cooled by the phase-changing material, the cooling reservoir 128, the heat exchanger 118, and the thermal transfer lines 130 may define a closed circuit that may be isolated from the remainder of the refrigeration system 100 and the energy capture system 300, for example, by valves, such that the phase-changing material may cool the reefer cooling fluid and not cool other components of the refrigeration system 100.

Pumps may be used in the refrigeration system 100 to direct fluids in a particular direction, for example, where pressure gradients are not present or insufficient to cause fluid flow to occur in the particular direction. In some embodiments, the reefer cooling fluid may be pumped from the cooling reservoir 128 to the heat exchanger 118 by a pump 132. The pump 132 is configured for pumping the reefer cooling fluid. For example, where the reefer cooling fluid is glycol or a water/glycol mixture, the pump 132 is configured for pumping glycol or a water/glycol mixture.

In addition to the cooling reservoir 128, the refrigeration system 100 comprises a refrigeration circuit for refrigerating the trailer 102. As depicted in FIG. 4, FIG. 5, FIG. 7, and FIG. 8, the refrigeration circuit comprises the compressor 112, the evaporator 114, the blower 116, the heat exchanger 118, and thermal transfer lines 120. The refrigeration circuit may define a closed circuit, such that the auxiliary cooling fluid in the refrigeration circuit is isolated from the reefer cooling fluid of the cooling reservoir 128. The auxiliary cooling fluid may be a refrigerant such as R404a or Freon. As depicted in FIG. 6, while the thermal transfer lines 120 and 130 connect the compressor 112 and the cooling reservoir 128, respectively, to the trailer 102, the thermal transfer lines 120 and 130 are not connected.

Each of the cooling reservoir 128 and the refrigeration circuit may be connected to the heat exchanger 118, or the cooling reservoir 128 and the refrigeration circuit may be connected to separate heat exchangers. Where the cooling reservoir 128 and the refrigeration circuit share the same heat exchanger 118, the reefer cooling fluid of the cooling reservoir 128 and the auxiliary cooling fluid of the refrigeration circuit are isolated from each other and not in direct fluid communication.

Figure 5:
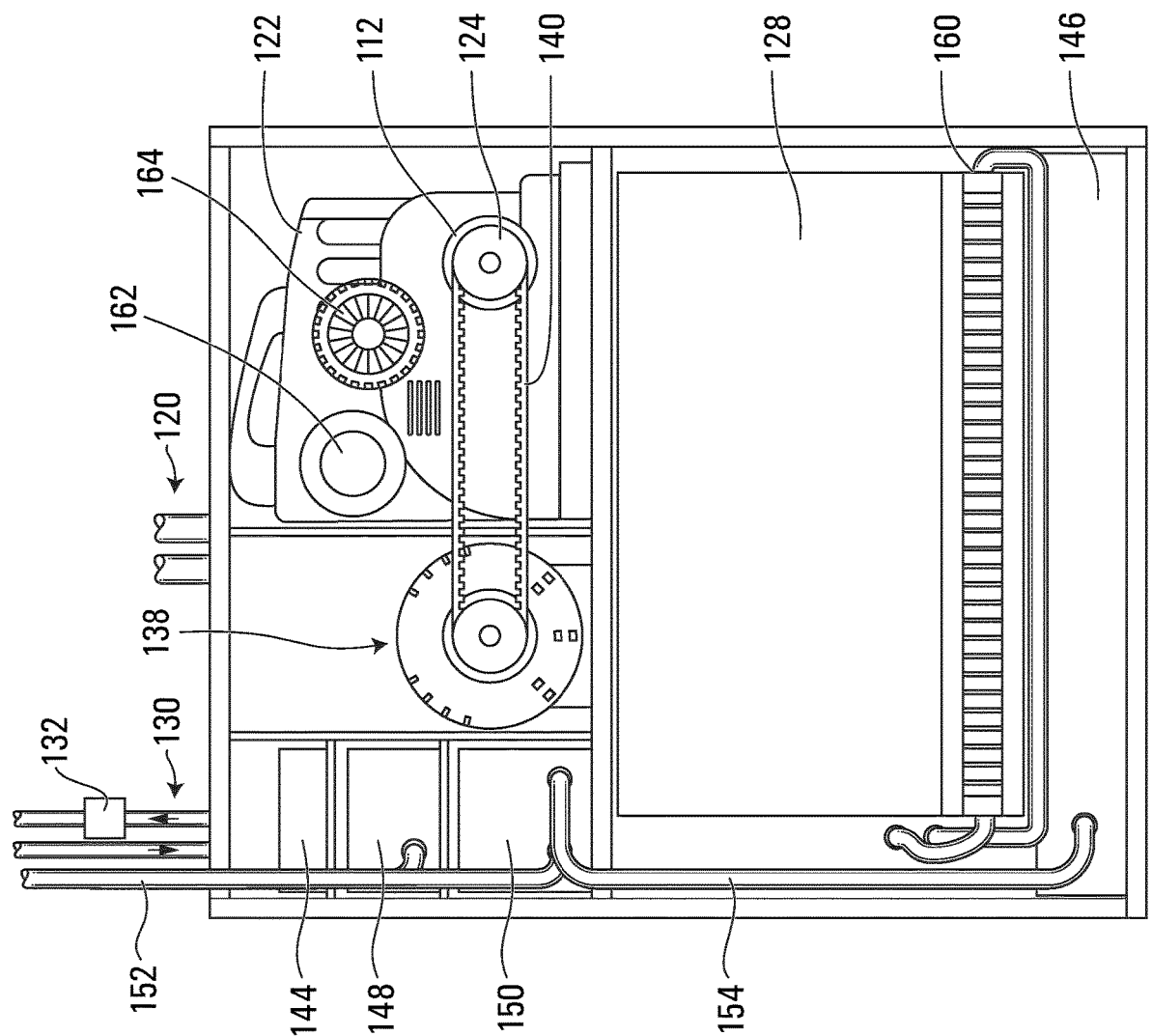
FIG. 5 is a schematic of a front view of the refrigeration system of FIG. 1.

The refrigeration system 100 may comprise an internal combustion motor 122 to drive the compressor 112, as depicted in FIG. 4 and FIG. 5. In some embodiments, the internal combustion motor 122 may be a diesel engine, such as a 2-cylinder or 3-cylinder diesel engine. The internal combustion motor 122 may be coupled to the compressor 112 with a clutch assembly 124. The clutch assembly 124 may couple the internal combustion motor 122 and the compressor 112 upon activation of an actuator 126. In some embodiments, the actuator 126 is a solenoid actuator. The controller 150 may be in data communication with the actuator 126, and may send a control command to the actuator 126 to activate the actuator 126.

In some embodiments, the refrigeration system 100 may comprise an electric motor 138 to drive the compressor 112. The electric motor 138 may be an AC or DC electric motor. The electric motor 138 may be coupled to the compressor 112 with a drive belt 140, as depicted in FIG. 5.

The electric motor 138 is in electric communication with an energy storage device 146. In some examples, the energy storage device is a battery bank having valve regulated lead acid batteries or absorbed glass mat batteries.

The energy storage device 146 may store electrical energy. In some embodiments, the electrical energy stored in the energy storage device 146 may be provided by an electrical power source, such as the photovoltaic cell array 142. The photovoltaic cell array 142 may comprise one or more solar panels. As depicted in FIG. 1, the photovoltaic cell array 142 may be mounted to the top surface 106 of the trailer 102. The photovoltaic cell array 142 converts solar radiation into direct current electrical energy. The electrical energy generated by the photovoltaic cell array 142 may be conducted to an inverter 144, as depicted in FIG. 5, to convert the direct current to alternating current. The photovoltaic cell array 142 is connected by the inverter 144 by a power transfer cable 152, as depicted in FIG. 5. In some embodiments, an inverter 144 may be connected to each solar panel of the photovoltaic cell array 142. The inverters 144 are in electrical communication with the energy storage device 146, and alternating current conducted to the energy storage device 146 may be stored in the energy storage device 146.

The energy storage device 146 may be charged using other electrical power sources. In some embodiments, the electrical power source may be mounted to or stored in the trailer or container that may be refrigerated by the refrigeration system 100. In other embodiments, the electrical power source may be an external electrical power source. For example, the electrical power source is shore power or grid power. As another example, the electrical power source is a fuel cell that may or may not be stored on board the trailer or container. As yet another example, the electrical power source is a regenerative braking system on board the trailer. As yet another example, the electrical power source is a wind turbine mounted to the vehicle or trailer that generates electrical energy while the vehicle is in motion.

In some embodiments, the electrical power source that charges the energy storage device 146 may be in electrical communication with the inverter 144, such that the energy storage device 146 may store the electrical energy provided by the electrical power source.

In some embodiments, the energy storage device 146 may be in electrical communication with the alternator of the engine of the vehicle on which the refrigeration system 100 is installed, such that operation of the vehicle charges the energy storage device 146.

In some embodiments, the energy storage device 146 comprises a battery management system. The battery management system may protect the energy storage device 146 from operating outside its safe operating area, monitoring its state, calculating data, and reporting data.

In some embodiments, the refrigeration system 100 comprises the charge controller 148 as depicted in FIG. 5. The charge controller 148 is configured to control the flow of electrical energy provided by the electrical power source, such as the electrical energy generated by the photovoltaic cell array 142, for storing using the energy storage device 146. The charge controller 148 is configured to charge the energy storage device 146 based on the provided electrical energy, whether the provided electrical energy is alternating current or direct current. The charge controller 148 may be in data communication with the photovoltaic cell array 142, the inverter 144, and the energy storage device 146.

The charge controller 148 may periodically send a control command to the photovoltaic cell array 142, and the photovoltaic cell array 142 may send a signal to the charge controller 148 corresponding to the direct current being generated by the photovoltaic cell array 142. The charge controller 148 may also periodically send a control command to the inverter 144, and the inverter 144 may send a signal to the charge controller 148 corresponding to the direct current being received by the inverter 144 from the photovoltaic cell array 142, and the amount of alternating current being converted by the inverter 144.

Where the energy storage device 146 is charged by another electrical power source, the inverter 144 may send a signal to the charge controller 148 corresponding to the characteristics of the electrical energy being received by the inverter 144 from the electrical power source, such as the voltage, frequency, and power of the electrical energy received by the inverter 144, and the amount of alternating current being converted by the inverter 144.

Based on the signals sent to the charge controller 148 from the photovoltaic cell array 142 and the inverter 144, the charge controller 148 may determine if electrical energy is being generated by the photovoltaic cell array 142, and if alternating current is available to be stored in the energy storage device 146.

Where the energy storage device 146 is charged by another electrical power source, based on the signals sent to the charge controller 148 from the inverter 144, the charge controller 148 may determine if electrical energy is being provided by the electrical power source, and if alternating current is available to be stored in the energy storage device 146. The charge controller 148 may send a control command to the inverter 144 to change the characteristics of the electrical energy received by the inverter 144, such that the alternating current converted by the inverter 144 may be stored in the energy storage device 146.

The charge controller 148 may periodically send a control command to the energy storage device 146, and the energy storage device 146 may send a signal to the charge controller 148 corresponding to the amount of energy that is stored in the energy storage device 146.

Based on the signals sent to the charge controller 148 from the energy storage device 146, the charge controller 148 may determine if the energy storage device 146 is fully charged or if the energy storage device 146 is not fully charged. If the energy storage device 146 is not fully charged, the charge controller 148 may send a control command to the inverter 144 to generate alternating current, based on direct current from the photovoltaic cell array 142 or based on the electrical energy provided by another electrical power source, and conduct the alternating current to the energy storage device 146.

The signal from the photovoltaic cell array 142, the inverter 144, and the energy storage device 146 may be a voltage provided by way of a wired connection.

In some embodiments, the refrigeration system 100 comprises a heat exchanger 160 interposed between the cooling reservoir 128 and the energy storage device 146 to maintain the temperature of the energy storage device 146 at or below a threshold temperature. The heat exchanger 106 may cool the energy storage device 146 if the energy storage device 146 overheats during operation.

In some embodiments, the refrigeration system 100 comprises an air compressor 162. The air compressor 162 may be coupled to and driven by the internal combustion motor 122.

In some embodiments, the refrigeration system 100 comprises an alternator 164. The alternator 164 may be coupled to and driven by the internal combustion motor 122.

The air compressor 162 is configured to provide compressed air. The compressed air may be used for operation of the trailer 102. For example, the compressed air may be conducted to the brakes of the trailer 102 so the trailer 102 remains stationary. The alternator 164 is configured to provide electrical energy. The electrical energy may be used for operation of the trailer 102. For example, the electrical energy may be used to power lights inside the trailer 102, or may be used to power the compressor 112. The air compressor 162 and the alternator 164 may allow the trailer 102 to be operational when the cooling reservoir 128 is not storing thermal energy, if the compressor 112 is not operational, if the energy storage device 146 does not have electrical energy, or if the trailer 102 is not connected to the cabin 110.

The air compressor 162 or the alternator 164 may be optional components of the refrigeration system 100, and may not be required by the refrigeration system 100 to cool the interior 108 of the trailer 102.

Figure 9:
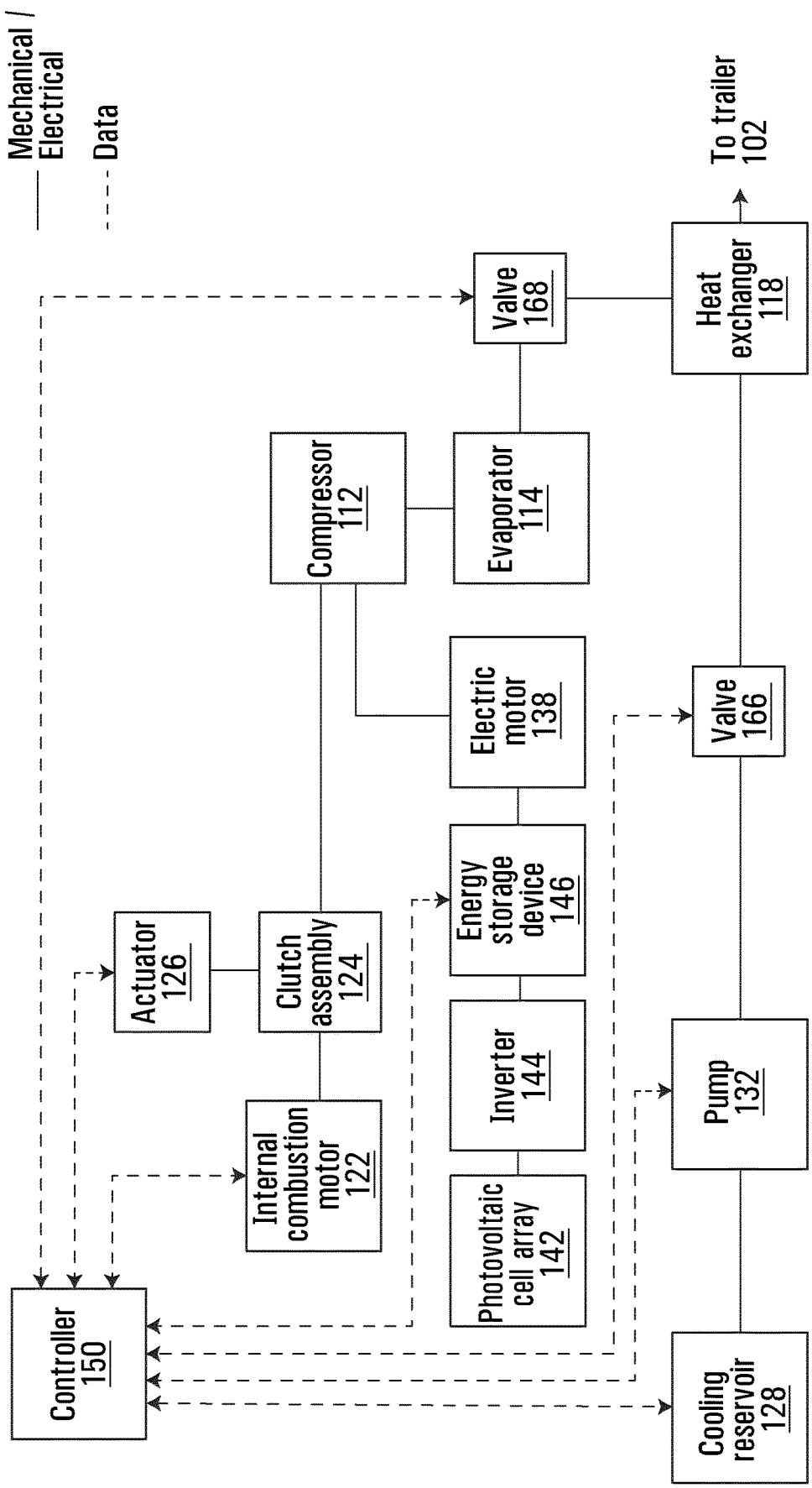
FIG. 9 is a block diagram of the refrigeration components and controls components of the refrigeration system of FIG. 1.

FIG. 9 is a block diagram of the refrigeration components and controls components of the refrigeration system 100. The refrigeration system 100 comprises the controller 150 for controlling whether the cooling reservoir 128 or the refrigeration circuit is used to cool the interior 108 of the trailer 102. The controller 150 comprises a processor coupled to a memory for storing or executing program code stored in the memory and a number of inputs and outputs for communicating with the various components of the refrigeration system 100. As noted in FIG. 9, the solid lines arrows indicate mechanical or electrical connections between the components of the refrigeration system 100, and the dashed lines indicate data communication between the controller 150 and the refrigeration system 100.

The controller 150 may monitor or collect data pertaining to operating parameters of the refrigeration system 100 or the vehicle on which the refrigeration system 100 is installed. The data that the controller 150 monitors or collects may include pressure and temperature of the phase-changing material in the cooling reservoir 128, the reefer cooling fluid, or auxiliary cooling fluid, voltage of electrical components, liquid level, flow rate, and vehicle operator inputs. Using data collected from these inputs and processing the information using control logic, the controller 150 directs the actions of the components of the refrigeration system 100 to maintain the trailer 102 at a desired temperature.

The trailer 102 may comprise one or more temperature transducers. The transducers may be placed in the interior 108 of the trailer 102, such as at the two ends and at the middle of the trailer 102 to detect the temperature inside the trailer 102. The controller 150 is in data communication with the temperature transducers in the trailer 102. The controller 150 receives signals from the transducers for the controller 150 to determine the temperature in the trailer 102. The controller 150 may be programmed to direct the refrigeration system 100 to cool the interior 108 of the trailer 102 if the trailer 102 is at or below a threshold temperature.

The controller 150 is in data communication with the cooling reservoir 128, such as by a thermocouple. The controller 150 may periodically send a control command to the cooling reservoir 128, and the cooling reservoir 128 may send a signal to the controller 150 corresponding to the temperature of the cooling reservoir 128. Based on the signal from the cooling reservoir 128, the controller 150 may determine the temperature of the cooling reservoir 128, which may correspond to the phase of the phase-changing material housed in the cooling reservoir 128. Where the phase-changing material is water, the controller 150 may determine whether the water is solid ice or liquid. The controller 150 may also determine whether the phase-changing material is sufficient cold to cool the reefer cooling fluid for cooling the trailer 102 to the desired temperature.

The controller 150 is in data communication with the pump 132, such as by a voltmeter. The controller 150 may periodically send a control command to the pump 132, and the pump 132 may send a signal to the controller 150 corresponding to the operational state of the pump 132, such as whether it is pumping reefer cooling fluid. Based on the signal from the pump 132, the controller 150 may send a control command to the pump 132 to change the operational state of the pump 132, such as whether the pump 132 is on or off, and the speed at which pump 132 is operating.

The refrigeration system 100 may comprise sensors for detecting the fluid flow rate in the thermal transfer lines 130. The refrigeration system 100 may further comprise sensors for detecting the fluid level in the cooling reservoir 128. The controller 150 may receive signals from these sensors, and may send a control command to the pump 132 to control operation and speed of the pump 132 based on the signal received from these sensors.

The controller 150 is in data communication with the energy storage device 146, such as by a voltmeter. The controller 150 may periodically send a control command to the energy storage device 146, and the energy storage device 146 may send a signal to the controller 150 corresponding to the amount of electrical energy stored in the energy storage device 146. Based on the signal from the energy storage device 146, the controller 150 may determine whether the energy storage device 146 may power the electric motor 138 to drive the compressor 112, and may send a control command to the energy storage device 146 to conduct stored electrical energy to the electric motor 138 to power the electric motor 138.

The controller 150 is in data communication with the internal combustion motor 122. The controller 150 may periodically send a control command to the internal combustion motor 122, and the internal combustion motor 122 may send a signal to the controller 150 corresponding to the operational state of the internal combustion motor 122, such as whether it is driving the compressor 112. Based on the signal from the internal combustion motor 122, the controller 150 may send a control command to the internal combustion motor 122 to change the operational state of the internal combustion motor 122, such as whether the internal combustion motor 122 is on or off, and the speed at which internal combustion motor 122 is operating.

The controller 150 is in data communication with the actuator 126. The controller 150 may periodically send a control command to the actuator 126, and the actuator 126 may send a signal to the controller 150 corresponding to the operational state of the actuator 126, such as whether it is activated to couple the internal combustion motor 122 and the compressor 112 via the clutch assembly 124. Based on the signal from the actuator 126, the controller 150 may send a control command to the actuator 126 to activate or de-activate the actuator 126 and to couple or decouple the internal combustion motor 122 and the compressor 112.

The refrigeration system 100 may comprise sensors for detecting the fluid flow rate in the thermal transfer lines 120. The controller 150 may receive signals from these sensors, and may send a control command to the energy storage device 146, the internal combustion motor 122, or the actuator 126 to control operation of the compressor 112 based on the signal received from these sensors.

In some embodiments, the controller 150 may be in electrical communication with the energy storage device 146 via a power cable 154 to receive power from the energy storage device 146 for operation of the controller 150.

In operation, the refrigeration system 100 as depicted in FIG. 1, FIG. 3, and FIG. 4, determines if the trailer 102 requires refrigeration based on the temperature of the trailer 102, and the refrigeration system 100 cools the interior 108 of the trailer 102 using either the cooling reservoir 128 or the refrigeration circuit. The controller 150 controls whether the cooling reservoir 128 or the refrigeration circuit is used to cool the interior 108 of the trailer 102, based on the data monitored or collected by the controller 150. The controller 150 may be configured to prioritize using the cooling reservoir 128 to cool the interior 108 of the trailer 102, then using the refrigeration circuit driven by the electric motor 138 to cool the interior 108 of the trailer 102, and then using the refrigeration circuit driven by the internal combustion motor 122 to cool the interior 108 of the trailer 102. In some embodiments, the controller 150 controls whether the cooling reservoir 128 or the refrigeration circuit is used to cool the interior 108 of the trailer 102, based on user input. For example, the user may select the target temperature of the interior 108 of the container or trailer.

In some circumstances, the refrigeration system 100 may be configured to cool the interior 108 of the trailer 102 using the cooling reservoir 128. The controller 150 may periodically send a control command to the cooling reservoir 128 and determine whether the phase-changing material is sufficiently cool for the cooling reservoir 128 to cool the interior 108 of the trailer 102. If the controller 150 determines that the phase-changing material is sufficiently cool for the cooling reservoir 128 to cool the interior 108 of the trailer 102, the controller 150 may send a control command to the pump 132 to circulate the reefer cooling fluid from the cooling reservoir 128 to the heat exchanger 118 in the trailer 102, and from the heat exchanger 118 to the cooling reservoir 128.

When the phase-changing material is sufficiently cool for the cooling reservoir 128 to cool the interior 108 of the trailer 102, the phase-changing material in the chambers, such as water, may be in a solid phase. When the reefer cooling fluid contacts the chambers inside the cooling reservoir 128, heat transfer may occur between the relatively cold phase-changing material and the relatively warm reefer cooling fluid, such that the temperature of the phase-changing material increases, and the temperature of the reefer cooling fluid decreases. The temperature of the phase-changing material may increase such that it changes from a solid phase to a liquid phase.

The pump 132 may pump the cooled reefer cooling fluid to the heat exchanger 118. As the reefer cooling fluid is directed to the heat exchanger 118, heat transfer may occur between the relatively cold reefer cooling fluid and the relatively hot air of the trailer 102 that may be directed into the heat exchanger 118 by a fan, such that the temperature of the reefer cooling fluid is increased and the temperature of the air of the trailer 102 is decreased. The blower 116 may blow the cooled air to circulate within the trailer 102 and to cool the interior 108 of the trailer 102.

In some circumstances, the controller 150 may determine that the phase-changing material is insufficiently cool for the cooling reservoir 128 to cool the interior 108 of the trailer 102. If the phase-changing material is insufficiently cool for the cooling reservoir 128 to cool the interior 108 of the trailer 102, the refrigeration system 100 may be configured to cool the interior 108 of the trailer 102 using the refrigeration circuit. The controller 150 may periodically send a control command to the energy storage device 146 and determine whether there is sufficient electrical energy stored in the energy storage device 146 to cool the interior 108 of the trailer 102. If the controller 150 determines that there is sufficient electrical energy stored in the energy storage device 146 to cool the interior 108 of the trailer 102, the controller 150 may send a control command to the energy storage device 146 to conduct electrical energy to the electric motor 138, such that the electric motor 138 drives the compressor 112 to circulate the auxiliary cooling fluid from the compressor 112 to the evaporator 114 and the heat exchanger 118, and from the heat exchanger 118 to compressor 112.

In some circumstances, the controller 150 may determine that the phase-changing material is insufficiently cool for the cooling reservoir 128 to cool the interior 108 of the trailer 102, and that there is insufficient electrical energy stored in the energy storage device 146 to cool the interior 108 of the trailer 102. In such embodiments, the controller 150 may send a control command to the actuator 126 to activate the actuator 126 and couple the internal combustion motor 122 and the compressor 112. The controller 150 may send a control command to the internal combustion motor 122 for the internal combustion motor 122 to drive the compressor 112 to circulate the auxiliary cooling fluid from the compressor 112 to the evaporator 114 and the heat exchanger 118, and from the heat exchanger 118 to compressor 112.

The auxiliary cooling fluid in the refrigeration circuit may be R404a or Freon. The compressor 112 may be driven by either the internal combustion motor 112 or the electric motor 138. As the auxiliary cooling fluid flows into the compressor 112, the compressor 112 increases the pressure of the auxiliary cooling fluid, and the pressurized auxiliary cooling fluid is directed to the evaporator 114. The pressure of the auxiliary cooling fluid is reduced by the evaporator 114, which causes the temperature of the auxiliary cooling fluid to decrease. As the auxiliary cooling fluid is directed to the heat exchanger 118, heat transfer may occur between the relatively cold auxiliary cooling fluid and the relatively hot air of the trailer 102 that may be directed into the heat exchanger 118 by a fan, such that the temperature of the auxiliary cooling fluid is increased and the temperature of the air of the trailer 102 is decreased. The blower 116 may blow the cooled air to circulate within the trailer 102 and to cool the interior 108 of the trailer 102.

In some embodiments, where the cooling reservoir 128 and the refrigeration circuit share the same heat exchanger 118, the refrigeration system 100 may comprise one or more valves upstream of the heat exchanger 118 or one or more valves downstream of the heat exchanger 118 for controlling fluid communication between the heat exchanger 118, and the cooling reservoir 128 or the refrigeration circuit. As depicted in FIG. 9, a valve 166 controls fluid communication between the pump 132 and the heat exchanger 118, and a valve 168 controls fluid communication between the evaporator 114 and the heat exchanger 118. If the controller 150 determines that the phase-changing material is sufficiently cool for the cooling reservoir 128 to cool the interior 108 of the trailer 102, the controller 150 may send control commands to the valves upstream, such as valves 166 and 168, or valves downstream of the heat exchanger 118 to configure the valves to allow fluid communication between the cooling reservoir 128 and the heat exchanger 118, and to disallow fluid communication between the refrigeration circuit and the heat exchanger 118. Accordingly, the reefer cooling fluid may flow from the cooling reservoir 128 to the heat exchanger 118 to cool the air in the trailer 102, and the reefer cooling fluid may flow from the heat exchanger 118 to the cooling reservoir 128 to be cooled by the cooling reservoir 128.

If the controller 150 determines that the phase-changing material is insufficiently cool for the cooling reservoir 128 to cool the interior 108 of the trailer 102, and that the refrigeration circuit should be used to cool the interior 108 of the trailer 102, the controller 150 may send control commands to the valves upstream, such as valves 166 and 168, or valves downstream of the heat exchanger 118 to configure the valves to allow fluid communication between the refrigeration circuit and the heat exchanger 118, and to disallow fluid communication between the cooling reservoir 128 and the heat exchanger 118. Accordingly, the auxiliary cooling fluid may flow from the compressor 112 and evaporator 114 to the heat exchanger 118 to cool the air in the trailer 102, and the auxiliary cooling fluid may flow from the heat exchanger 118 to the compressor 112.

In some embodiments, a single valve may control fluid communication between the heat exchanger 118, and the cooling reservoir 128 or the refrigeration circuit.

Figure 10:
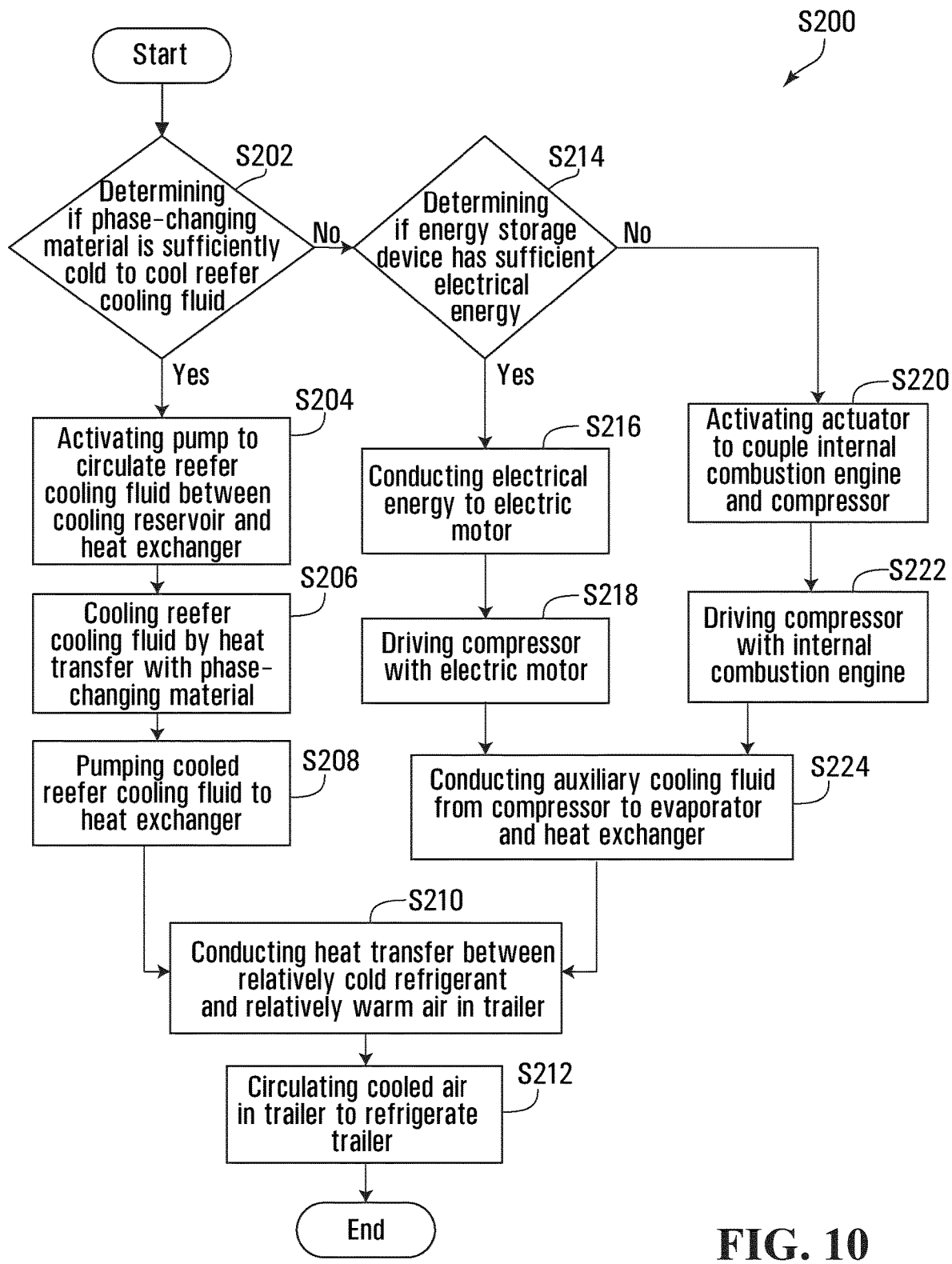
FIG. 10 is a flow chart depicting a method of using the refrigeration system of FIG. 1 to cool the interior of the trailer.

FIG. 10 is a flow chart depicting a method S200 of using the refrigeration system 100 to cool the interior 108 of the trailer 102.

At block S202, the controller 150 of the refrigeration system 100 determines if the phase-changing material housed in the cooling reservoir 128 is sufficiently cold to cool the reefer cooling fluid and to cool the interior 108 of the trailer 102. The phase-changing material may be cooled by heat transfer with a thermal storage fluid that was cooled using thermal energy that was captured by the energy capture system 300 from an engine exhaust stream.

At block S204, if the controller 150 determines that the phase-changing material housed in the cooling reservoir 128 is sufficiently cold to cool the reefer cooling fluid and to cool the interior 108 of the trailer 102, the controller 150 sends a control command to the pump 132 to circulate the reefer cooling fluid from the cooling reservoir 128 to the heat exchanger 118 in the trailer 102, and from the heat exchanger 118 to the cooling reservoir 128.

At block S206, the reefer cooling fluid contacts the chambers inside the cooling reservoir 128 housing the phase-changing material, and the reefer cooling fluid is cooled by heat transfer between the relatively cold phase-changing material and the relatively warm reefer cooling fluid. The temperature of the phase-changing material increases, and the temperature of the reefer cooling fluid decreases.

At block S208, the cooled reefer cooling fluid is pumped to the heat exchanger 118.

At block S210, heat transfer may occur between the relatively cold reefer cooling fluid and the relatively hot air of the trailer 102 that may be directed into the heat exchanger 118 by a fan, such that the temperature of the reefer cooling fluid is increased and the temperature of the air of the trailer 102 is decreased.

At block S212, the blower 116 may blow the cooled air to circulate within the trailer 102 and to cool the interior 108 of the trailer 102.

At block S214, if the controller 150 determines that phase-changing material housed in the cooling reservoir 128 is insufficiently cold to cool the reefer cooling fluid and to cool the interior 108 of the trailer 102, the controller 150 determines if the energy storage device 146 has stored sufficient electrical energy to operate the electric motor 138 and to cool the interior 108 of the trailer 102.

At block S216, if the controller 150 determines if the energy storage device 146 has stored sufficient electrical energy, the controller 150 sends a control command to the energy storage device 146 to conduct electrical energy to the electric motor 138.

At block S218, with electrical energy conducted to the electric motor 138, the electric motor 138 drives the compressor 112, such as by the drive belt 140.

At block S220, if the controller 150 determines if the energy storage device 146 has stored insufficient electrical energy, the controller 150 sends a control command to the actuator 126 to activate the actuator 126 and couple the internal combustion motor 122 and the compressor 112.

At block S222, the controller 150 sends a control command to the internal combustion motor 122 for the internal combustion motor 122 to drive the compressor 112.

At block S224, whether the compressor 112 is driven by the internal combustion motor 112 or the electric motor 138, as the auxiliary cooling fluid flows into the compressor 112, the compressor 112 increases the pressure of the auxiliary cooling fluid, and the pressurized auxiliary cooling fluid is directed to the evaporator 114 and the heat exchanger 118. The pressure of the auxiliary cooling fluid is reduced by the evaporator 114, which causes the temperature of the auxiliary cooling fluid to decrease.

Similar to the reefer cooling fluid as discussed above with respect to block S210, as the auxiliary cooling fluid is directed to the heat exchanger 118, heat transfer may occur between the relatively cold auxiliary cooling fluid and the relatively hot air of the trailer 102 that may be directed into the heat exchanger 118 by a fan, such that the temperature of the auxiliary cooling fluid is increased and the temperature of the air of the trailer 102 is decreased.

As discussed above with respect to block S212, the blower 116 blows the cooled air to circulate within the trailer 102 and to cool the interior 108 of the trailer 102.

The preceding discussion provides many example embodiments. Other examples may include all suitable combinations of the disclosed elements. For example if one embodiment comprises elements A, B, and C, and a second embodiment comprises elements B and D, other remaining suitable combinations of A, B, C, or D, may also be used.

The term "connected" or "coupled to" may include both direct coupling (in which two elements that are coupled to each other contact each other) and indirect coupling (in which at least one additional element is located between the two elements).

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. The examples described above and illustrated are intended to be examples only. Modifications may be possible. The invention is defined by the appended claims.

What is claimed is:

1. A refrigeration system for cooling a refrigeration compartment, comprising:
    a cooling reservoir for cooling a first refrigerant using energy recovered from an exhaust stream of a vehicle engine;
    a refrigeration circuit comprising a compressor configured to be driven by an internal combustion motor, the compressor circulating a second refrigerant, said second refrigerant being isolated from said first refrigerant;
    at least one heat exchanger in communication with the first and second refrigerants to receive cooled refrigerant;
    at least one blower for forcing air over the at least one heat exchanger; and
    an electric motor configured to drive the compressor;
    an energy storage device in electrical communication with the electric motor;
    a controller configured to cool the refrigeration compartment by one of:
        a) using the cooling reservoir to cool the refrigeration compartment when the controller determines that the cooling reservoir is sufficiently cool to cool the refrigeration compartment;
        b) activating the electric motor to drive the compressor when the controller determines that the cooling reservoir is not sufficiently cool to cool the refrigeration compartment and the controller determines that the energy storage device has sufficient electrical energy to cool the refrigeration compartment; and
        c) activating the internal combustion motor to drive the compressor when the controller determines that the cooling reservoir is not sufficiently cool to cool the refrigeration compartment and the controller determines that the energy storage device does not have sufficient electrical energy to cool the refrigeration compartment.

2. The refrigeration system of claim 1, wherein said energy recovered from said exhaust stream of said engine is recovered by an energy capture system comprising a generator configured to receive the engine exhaust stream and circulate a solution comprising a solute, the solute vaporizable into a gaseous state by heat absorbed from the received engine exhaust stream.

3. The refrigeration system of claim 2, wherein the energy capture system comprises:

a condenser fluidly coupled to the generator for receiving solute vaporized from the solution, the condenser configured to condense the vaporized solute into a liquid state; and
    an evaporator fluidly coupled to the condenser, the evaporator configured to vaporize the solute into the gaseous state and promote heat exchange between the vaporized solute and refrigerant in a third loop.

4. The refrigeration system of claim 1, comprising:
    a photovoltaic cell array;
    wherein the energy storage device is in electrical communication with the photovoltaic cell array for storing electrical energy.

5. The refrigeration system of claim 1, comprising a charge controller for selectively conducting electrical energy to the energy storage device to store the electrical energy.

6. The refrigeration system of claim 1, wherein the at least one blower comprises a single blower for forcing air over the at least one heat exchanger.

7. The refrigeration system of claim 1, wherein the cooling reservoir and the refrigeration circuit are in communication with a single heat exchanger to selectively receive refrigerant from the first loop or the second loop.

8. The refrigeration system of claim 1, comprising a heat exchanger interposed between the cooling reservoir and the energy storage device for cooling the energy storage device.

9. The refrigeration system of claim 1, wherein the cooling reservoir houses a phase changing material configured to remove thermal energy from the first refrigerant by changing phase.

10. The refrigeration system of claim 9, wherein the phase changing material is configured to transfer thermal energy to a third refrigerant by changing phase.

11. The refrigeration system of claim 1, wherein the refrigeration compartment is a vehicle refrigeration compartment.

12. A method for cooling a vehicle component, comprising:
    cooling a first refrigerant in a cooling reservoir using energy recovered from an exhaust stream of a vehicle engine;
    circulating a second refrigerant with a compressor, the compressor configured to be driven by an internal combustion motor, and said second refrigerant isolated from said first refrigerant;
    forcing air over at least one heat exchanger in communication with the first and second refrigerants with at least one blower; and
    cooling the vehicle component by one of:
        a) using the cooling reservoir to cool the vehicle component when a controller determines that the cooling reservoir is sufficiently cool to cool the vehicle component;
        b) conducting electrical energy storage energy storage device to an electric motor configured to drive the compressor when the controller determines that the cooling reservoir is not sufficiently cool to cool the vehicle component and the controller determines that the energy storage device has sufficient electrical energy to cool the vehicle component; and
        c) activating, by the controller, the internal combustion motor when the controller determines that the cooling reservoir is not sufficiently cool to cool the vehicle component and the controller determines that the energy storage device does not have sufficient electrical energy to cool the vehicle component.

13. The method of claim 12, comprising:
converting solar energy to electrical energy with a photovoltaic cell array;
storing the electrical energy in the energy storage device to power the electric motor.

14. The method of claim 13, comprising selectively conducting the electrical energy to the energy storage device to store the electrical energy.

15. The method of claim 12, comprising forcing air over the at least one heat exchanger with one blower.

16. The method of claim 12, comprising selectively connecting one of the first refrigerant and the second refrigerant in fluid communication with one heat exchanger.

17. The method of claim 12, comprising cooling the energy storage device with the cooling reservoir.

18. The method of claim 12, comprising changing phase of a phase changing material housed in the cooling reservoir when the phase changing material receives sufficient thermal energy from the first refrigerant.

19. The method of claim 18, comprising changing phase of the phase changing material when the phase changing material transfers sufficient thermal energy to a third refrigerant.

20. The method of claim 12, comprising:
absorbing heat from the exhaust stream of the vehicle engine; and
vaporizing a solute of a solution into a gaseous state by the absorbed heat.

21. The method of claim 20, comprising:
condensing the vaporized solute into a liquid state;
re-vaporizing the solute into the gaseous state; and
promoting heat exchange between the re-vaporized solute and a third refrigerant.

22. A refrigeration system for cooling a vehicle refrigeration compartment, comprising:
a cooling reservoir for cooling a first refrigerant using energy recovered by an energy capture system from an exhaust stream of a vehicle engine;
a refrigeration circuit comprising a compressor driven by a diesel motor, the compressor circulating a second refrigerant, said second refrigerant being isolated from said first refrigerant;
a heat exchanger in communication with the cooling reservoir and the refrigeration circuit to receive a stream of the first refrigerant and a stream of the second refrigerant;
a blower for forcing air over the heat exchanger;
an electric motor configured to drive the compressor;
an energy storage device in electrical communication with the electric motor; and
a controller configured to cool the refrigeration compartment by one of:
a) using the cooling reservoir to cool the refrigeration compartment when the controller determines that the cooling reservoir is sufficiently cool to cool the refrigeration compartment;
b) conducting electrical energy to the electric motor to activate the electric motor and drive the compressor when the controller determines that the cooling reservoir is not sufficiently cool to cool the refrigeration compartment and the controller determines that the energy storage device has sufficient electrical energy to cool the refrigeration compartment; and
c) activating the diesel motor to drive the compressor when the controller determines that the cooling reservoir is not sufficiently cool to cool the refrigeration compartment and the controller determines that the energy storage device does not have sufficient electrical energy to cool the refrigeration compartment.

23. The refrigeration system of claim 22, comprising:
a photovoltaic cell array configured to convert solar energy to electrical energy;
wherein the energy storage device in electrical communication with the photovoltaic cell array for storing the electrical energy.

24. The refrigeration system of claim 22, wherein the energy capture system comprises:
a generator configured to receive the exhaust stream of the vehicle engine and circulate a solution comprising a solute, the solute vaporizable into a gaseous state by heat absorbed from the received exhaust stream of the vehicle engine;
a condenser fluidly coupled to the generator for receiving solute vaporized from the solution, the condenser configured to condense the vaporized solute into a liquid state; and
an evaporator fluidly coupled to the condenser, the evaporator configured to re vaporize the solute into the gaseous state and promote heat exchange between the re vaporized solute and a third refrigerant.

* * * * *